Feb. 10, 1953  G. H. WHITESIDE  2,627,802
BALE CASE MOUNTING LATCH MECHANISM
Filed Oct. 20, 1950  2 SHEETS—SHEET 1
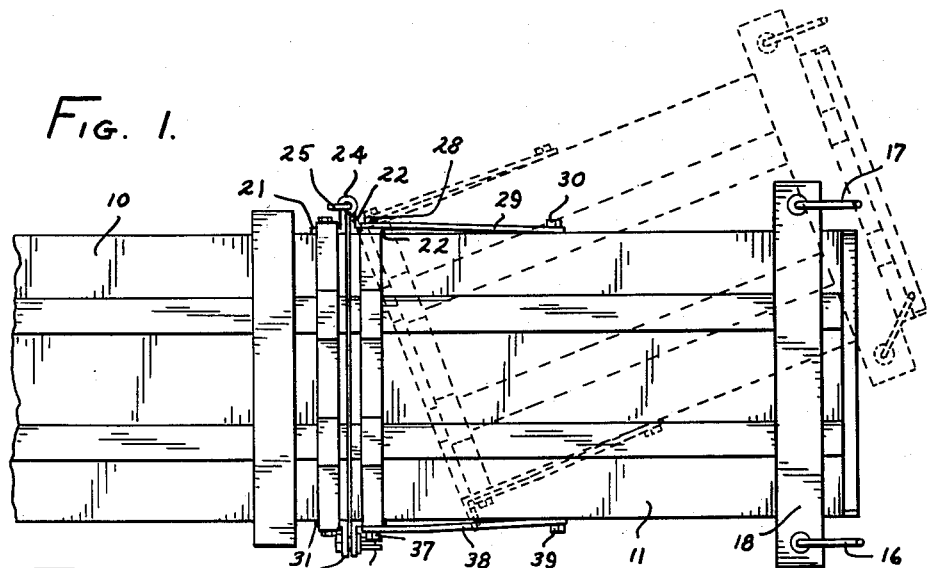
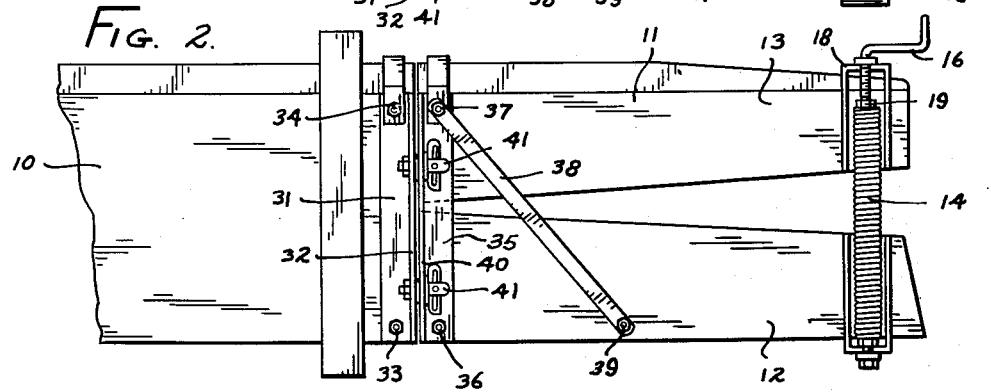
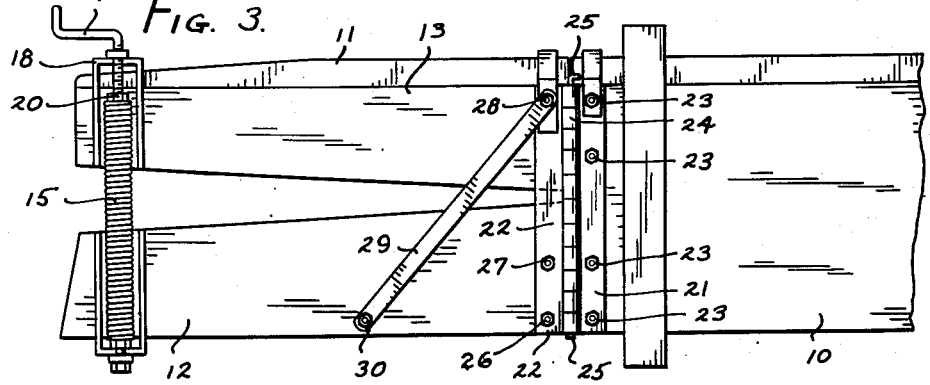
INVENTOR,
GEORGE H. WHITESIDE,
By Herbert A. Minturn,
ATTORNEY.

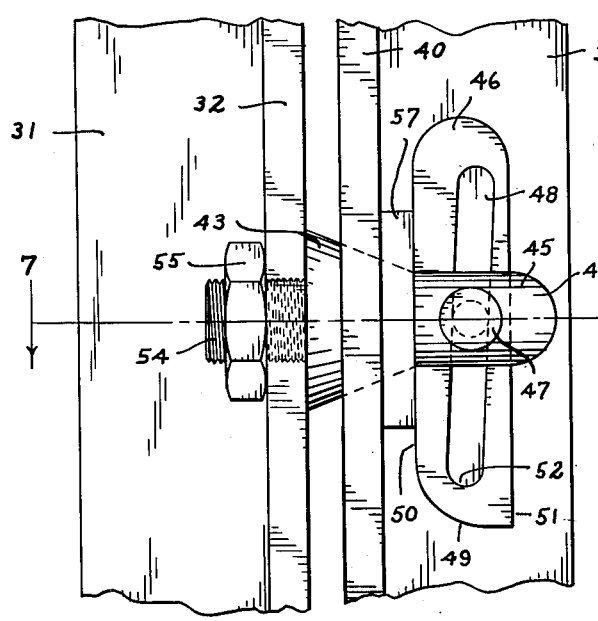
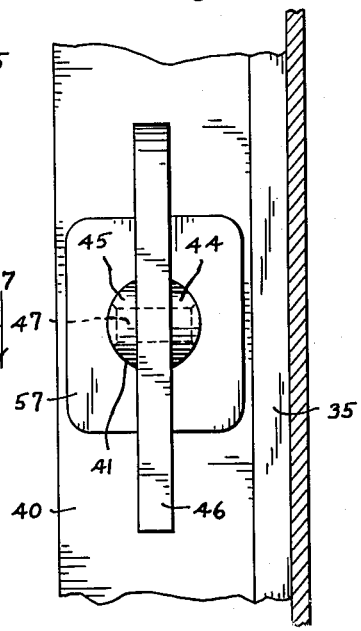
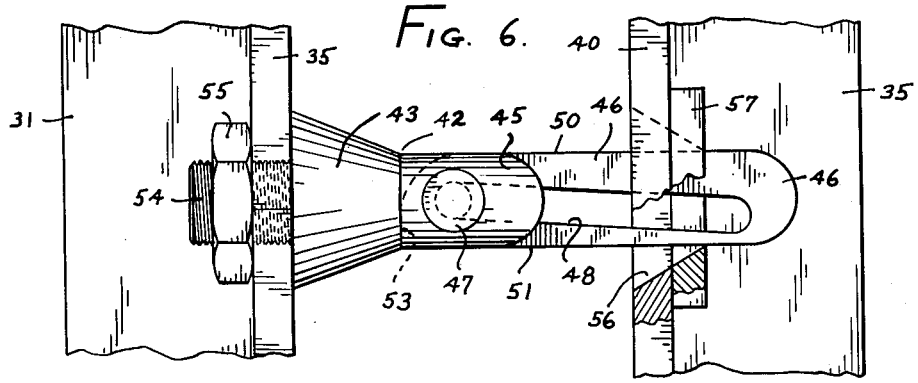
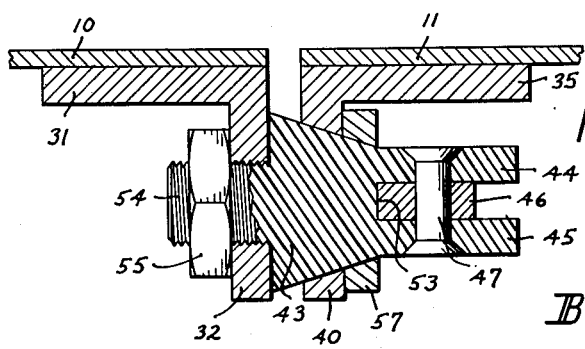

Patented Feb. 10, 1953

2,627,802

UNITED STATES PATENT OFFICE 2,627,802

BALE CASE MOUNTING LATCH MECHANISM

George H. Whiteside, Indianapolis, Ind.

Application October 20, 1950, Serial No. 191,275

1 Claim. (Cl. 100—192)

This invention involves mounting a baling machine tension chamber at the end of the bale case in such manner that it may be quickly released, even though carrying a bale therein, to permit the chamber to be swung around and into a position limited only by coming into substantial parallelism along side of the bale case.

In a late model of a baling machine, the bale is compressed within a bale case against a previously formed bale carried in a tension chamber, both the case and the chamber extending transversely across the back portion of the machine, transversely of the direction of the travel of the machine so that the bale is eventually discharged from the side of the machine.

This structure requires that the tension chamber project almost its entire length beyond the side of the baling machine, so that in transporting the machine, particularly on the highway, and in passing through gates, the tension chamber projects to such a distance that in the case of the highway, more than half of the highway width is required for travel of the machine on the highway, and in the case of the gate, the tension chamber in many instances has to be demounted from the case, such as in taking off at least a portion thereof and throwing it back on top of the case. To demount the tension case, sufficiently to get it out of the way, it requires considerable time, and also requires that there be no bale in the tension chamber. This is a handicap in starting up the baling machine again in order to get the desired tension at least upon the first bale or bales formed since there would be no bale in the chamber, to supply the necessary tension against which a succeeding bale is formed.

In my invention, the tension chamber is not in any way dismantled, but a bale already therein can be left intact, without any tension being changed one way or the other, and the chamber can be released to swing around a vertical axis by one inner corner thereof, so that all that has to be done is to release not over two quick acting latches to permit the tension chamber to be swung out of the way, and then when the machine is ready to operate in the field, the chamber may be swung around again and secured in its position in line with bale case with a very limited amount of time being taken in the operation.

The invention is described in reference to the accompanying drawings, in which

Fig. 1 is a view in top plan of an end portion of the bale case with a tension chamber secured thereto embodying the invention;

Fig. 2 is a front side elevation of the structure;

Fig. 3 is a rear elevation;

Fig. 4 is a detail on an enlarged scale in side elevation of the quick latching mechanism;

Fig. 5 is a view in end elevation of the latching mechanism;

Fig. 6 is a view of the latching mechanism in the disengaging position; and

Fig. 7 is a horizontal section on the line 7—7 in Fig. 4.

The bale case 10 is formed in the usual manner to be a generally rectangular chamber through which the bale is pressed and caused to travel by succeeding movements of the baling ram. The tension chamber generally designated by the numeral 11 is made in two principal parts, namely the lower portion 12 and an upper portion 13 which is hinged to travel upwardly and downwardly in relation to the portion 12, to be controlled by side tension springs 14 and 15. The tension of these springs 14 and 15 is controlled in the usual manner by means of the upper cranks 16 and 17 which are rotatably carried through a top cross bar 18 to screw-threadedly engage in nuts 19 and 20 respectively fixed to the upper ends of the springs 14 and 15. The springs 14 and 15 yieldingly resist rocking upwardly of the outer end of the upper tension chamber section 13.

I provide a pair of angle irons 21 and 22, along the respective adjacent ends of the bale case 10 and the tension chamber 11, Fig. 3. The angle iron 21 is fixed by means of a plurality of bolts 23 along the vertical rear end of the bale case 10, and the outturned leg of the angle iron 21 is formed into a part of the hinge 24 which is completed by the outturned leg of the angle iron 22, the two portions being interengaged in a hinged manner by the hinge pin 25.

The angle iron 22 is secured in fixed position to the lower tension chamber section 12 by means of bolts 26 and 27. The upper tension chamber section 13 is attached to the angle bar 22 at its upper end by a single bolt 28 so that the section 13 may be free to rock about that bolt 28. A brace 29 is engaged by the bolt 28 at its upper end, and is tied to the lower tension chamber section 12 by a bolt 30, so as to aid in supporting the lower section 12 in a rigid manner. The angle bar 21 and 22 and the brace 29 is applied to the rear side of the bale case 10 and the tension chamber 11, all as indicated in Fig. 3.

On the front side of the bale case 10 I affix an angle bar vertically, this bar being designated by the numeral 31, to extend along the rear edge of the case 10 with a leg 32 turned outwardly therefrom. In the structure herein shown, this bar 31 is engaged to the bale case 10 by bolts 33 and 34. Another angle iron 35 is attached by its lower end through a bolt 36 to the tension chamber lower section 12, Fig. 2, and is attached to the upper section 13 by a bolt 37 at the upper end thereof, in such manner that the section 13 is free to rock around that bolt 37. Then there is a brace 38 having its upper end engaged by the bolt 37, to extend diagonally downwardly and outwardly therefrom to be attached by its lower end to the section 12 by a bolt 39 so as to aid in supporting that section 12. Thus it is to be seen that the upper section 13 is free to rock in relation to the fixed section 12 on the bolts 28 and 37. The angle iron 35 has an outturned leg 40 which is in parallelism with the leg 32.

A plurality of latching devices generally designated by the numeral 41, herein shown as two in number, are employed to interengage these two angle bar legs 32 and 40 to hold the tension chamber 11 in its position as an extension of the bale case 10. This latching device is shown in detail in Figs. 4–7.

A bolt 42 is provided with a tapered head 43 from which extends outwardly therefrom a pair of ears 44 and 45 separated to receive rockably therebetween a wedge bar 46, the bar 46 being retained therebetween by means of a rivet or pin 47. This bar 46 while having parallel side edges, is provided with a slot 48 which is angularly disposed in relation to those edges, to extend substantially throughout the entire longitudinal length of the bar.

An end portion 49 of the bar 46 is rounded from the edge 50 to terminate by an end substantially at right angles to the opposite edge 51. The location of the end 52 of the slot 48 in reference to the rounded end 49 is made to be such that, Fig. 6, when the bar 46 is rocked about the rivet 47, to have the under edge 51 substantially horizontally disposed, the straight portion 53 of the end 49 will abut the head 43 which is exposed between the inner ends of the ears 44 and 45, whereby the bar 46 is then supported in a horizontally directed position, all as indicated in Fig. 6.

The bolt 43 is provided with a stud 54 which extends through the angle bar leg 32 to be fixed in position by means of a nut 55 on the stud 54 seating the head 43 against the outer face of the leg 32.

Axially aligned with the stud 54 is a tapered hole 56 in the leg 40 of the angle bar 35 so that when the extension chamber 11 is swung around the hinge pin 25 from such a position as indicated by the dash lines in Fig. 1, to have the leg 40 of the angle iron 35 approach the leg 32 of the angle iron 31, the outer end of the wedge bar 46 when in its horizontally disposed position as indicated in Fig. 6, will enter that hole 56, and be guided therethrough by the tapered upper and lower ends thereof, so that the leg 40 may be brought on back to have the head 43 seated in the hole 56, at which position, the ears 44 and 45 will be extended beyond the leg 40 to permit the rocking of the wedge bar 46 into a position to have the end 49 turn downwardly, whereupon the bar 46 may be tapped lightly to cause the bar to tend to pull the bolt 43 further through the leg 40, thereby wedging the two parts together, to have the bar 46 assume the positions indicated in Figs. 4 and 5. Preferably a wedge plate 57 is fixed on the inner face of the leg 40 to have the hole 56 continue therethrough, so that this plate 57 serves as the actual bearing to receive the edge 50 of the bar 46 thereagainst. The tapered portion of the head 43 serves to align the tension chamber properly with the bale case 10 since the head 43 will seat itself snugly in the hole 56 so as to prevent vertical movement between the leg 40 and the leg 32. As indicated in Figs. 4 and 6, the slot 48 slopes from near the rounded end 49 from the edge 50 diagonally across the bar 46 toward the other end thereof to terminate adjacent the edge 51.

Thus by reason of the structure defined, the bailing case 11 is hinged as a unit about the pin 25 which interengages the two angle irons 21 and 22 on the back side of the device, so that the case may be swung as indicated by the dash lines, when the latches 41 are released to be in the positions shown in Fig. 6. The bale which may be present in that chamber and normally is, under the usual operating conditions, may be left therein, instead of having to be removed, and therefore when the bailing machine is to be transported, all that need to be done is to tap the two bars 46 to loosen them so that they may be rocked to their horizontal positions whereupon the chamber 11 may be swung around out of the way. Then when the machine is ready to be operated, the chamber 11 may be pulled around into alignment with the case end, and the bars 46 rocked around to their fully last positions as indicated in Fig. 4 to hold the tension chamber 11 firmly in place and securely against the pressure generated by the baling ram pushing the bale through the chamber 11.

While I have herein shown and described my invention in the one particular form, it is obvious that structural changes may be employed without departing from the spirit of the invention, and I therefore do not desire to be limited to that form beyond the limitations which may be imposed by the following claim.

I claim:

A latch mechanism comprising a head; a wedge bar having substantially parallel side edges and a slot extending longitudinally of and diagonally between said side edges; a pin extending through said slot and held by said head; and a keeper member having a hole therethrough, through which said head may extend in part to carry said bar on the side of the member opposite from the head entry side, sufficiently forward to permit said bar to rock on the said pin to drop in wedging action between the pin and said opposite side; said bar having the corner of one end rounded from one of said edges, from which rounded portion the end merges into an angular corner with the opposite bar edge; an abutment on said head; and said bar having its slot terminating by an end adjacent said rounded corner end to provide a bar end portion thickness between said bar end and said slot end whereby a horizontal position of the bar will be maintained by contact of the angular corner with said abutment.

GEORGE H. WHITESIDE.

REFERENCES CITED

The following references are of record in the file of this patent:

UNITED STATES PATENTS

| Number | Name | Date |
|---|---|---|
| 1,029,422 | Cashon | June 11, 1912 |
| 1,542,468 | Mueller | June 16, 1925 |
| 1,650,454 | Langan | Nov. 22, 1927 |
| 1,892,613 | Edgin | Dec. 27, 1932 |
| 2,389,510 | Hitchcock | Nov. 20, 1945 |
| 2,484,890 | Hill | Oct. 18, 1949 |
| 2,518,402 | Totman | Aug. 8, 1950 |

FOREIGN PATENTS

| Number | Country | Date |
|---|---|---|
| 223,508 | Switzerland | Dec. 1, 1942 |